United States Patent
Jeon et al.

(10) Patent No.: US 9,442,320 B2
(45) Date of Patent: Sep. 13, 2016

(54) DISPLAY PANEL AND DISPLAY APPARATUS INCLUDING THE SAME

(71) Applicant: Samsung Display Co., LTD., Yongin, Gyeonggi-Do (KR)

(72) Inventors: Yong-Chan Jeon, Ulsan (KR); Hyo-Suk Park, Seoul (KR); Hyun-Woong Baek, Seoul (KR); Seung-Suk Yang, Asan-si (KR); Hyeong-Jun Jin, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 109 days.

(21) Appl. No.: 14/312,822

(22) Filed: Jun. 24, 2014

(65) Prior Publication Data
US 2015/0185549 A1   Jul. 2, 2015

(30) Foreign Application Priority Data
Jan. 2, 2014   (KR) .................. 10-2014-0000146

(51) Int. Cl.
*G02F 1/1333*   (2006.01)
*G02F 1/1335*   (2006.01)

(52) U.S. Cl.
CPC ................ *G02F 1/133512* (2013.01); *G02F 2001/133388* (2013.01)

(58) Field of Classification Search
CPC ................ G02F 1/133514; G02F 1/133512
See application file for complete search history.

(56) References Cited

U.S. PATENT DOCUMENTS

| 8,355,100 B2 | 1/2013 | Shiau |
| 2010/0265449 A1 | 10/2010 | Kira et al. |
| 2011/0025967 A1 | 2/2011 | Sohn et al. |
| 2011/0180798 A1* | 7/2011 | Shim ............ G02F 1/133512 257/59 |
| 2011/0221990 A1 | 9/2011 | Lee et al. |
| 2011/0222012 A1 | 9/2011 | Park et al. |
| 2012/0002142 A1 | 1/2012 | Asaoka et al. |
| 2012/0188493 A1* | 7/2012 | Sato ............ G02F 1/133351 349/104 |
| 2012/0224131 A1 | 9/2012 | Kunimatsu et al. |
| 2014/0002778 A1* | 1/2014 | Lin ............ G02F 1/133512 349/106 |

FOREIGN PATENT DOCUMENTS

| JP | 4851651 B2 | 11/2011 |
| KR | 1020050002410 A | 1/2005 |
| KR | 1020080001536 A | 1/2008 |
| KR | 1020100075023 A | 7/2010 |
| KR | 1020110071579 A | 6/2011 |

* cited by examiner

*Primary Examiner* — Nathanael R Briggs
(74) *Attorney, Agent, or Firm* — Cantor Colburn LLP

(57) ABSTRACT

A display panel includes a first substrate, a second substrate which faces the first substrate and includes a light blocking pattern including a light blocking portion disposed in a display area and a peripheral area surrounding the display area, and a light transmitting portion which is disposed in the peripheral area and includes the same material as that of the light blocking portion, and a liquid crystal layer interposed between the first substrate and the second substrate, where a thickness of the light transmitting portion taken along a vertical direction in a cross section is less than a thickness of the light blocking portion taken along the vertical direction in the cross section.

20 Claims, 17 Drawing Sheets

FIG. 1
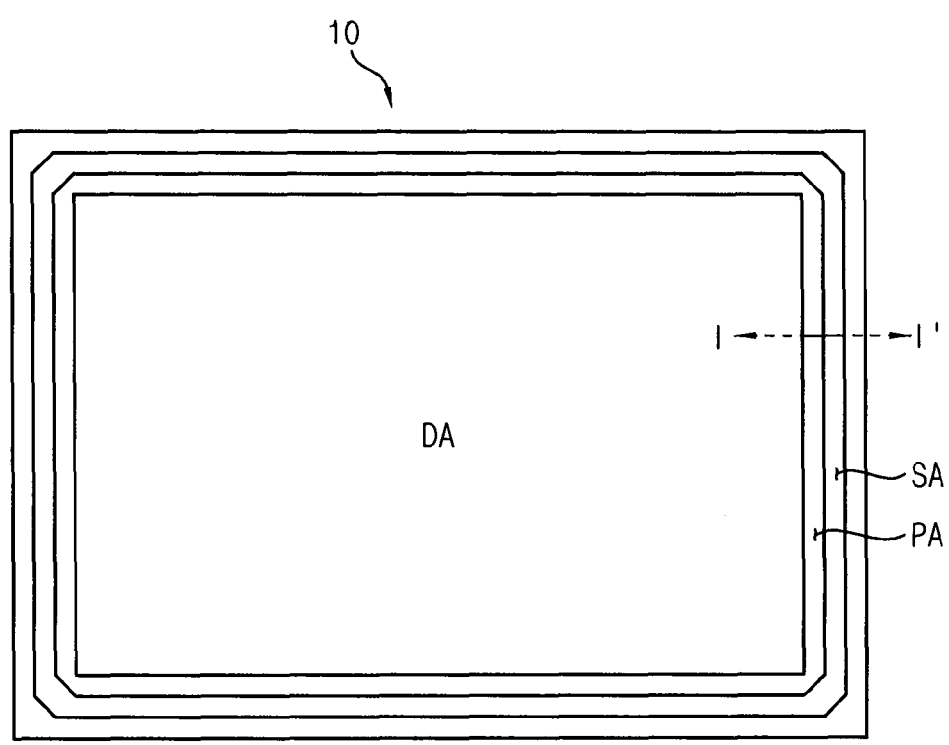
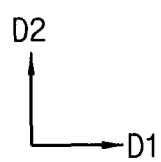

DISPLAY PANEL AND DISPLAY APPARATUS INCLUDING THE SAME

This application claims priority under 35 U.S.C. §119 to Korean Patent Application No. 10-2014-0000146, filed on Jan. 2, 2014, and all the benefits accruing therefrom under 35 U.S.C. §119, the contents of which are herein incorporated by reference in their entireties.

BACKGROUND

1. Field

The invention relates to a display panel and a display apparatus including the display panel. More particularly, the invention relates to a display panel used for a display apparatus and a display apparatus including the display panel.

2. Description of the Related Art

Recently, a liquid crystal display ("LCD") apparatus having light weight and small size has been manufactured. A cathode ray tube ("CRT") display apparatus has been used due to a performance and a competitive price. However, the CRT display apparatus has a weakness with a size or portability. Therefore, the LCD apparatus has been highly regarded due to small size, light weight and low-power-consumption of the LCD apparatus.

The LCD apparatus may include pixels having various structures according to a driving method. There have been various researches to improve an aperture ratio and a transmittance according to the various structures of the pixels.

SUMMARY

Exemplary embodiments of the invention provide a display panel capable of decreasing a faulty of the liquid crystal.

The invention also provides a display apparatus including the display panel.

In an exemplary embodiment of a display substrate according to the invention, the display panel includes a first substrate, a second substrate facing the first substrate, and a liquid crystal layer interposed between the first substrate and the second substrate. The second substrate includes a light blocking pattern including a light blocking portion and a light transmitting portion. The light blocking portion is disposed in a display area and a peripheral area surrounding the display area. The light transmitting portion is disposed in the peripheral area. The light transmitting portion includes the same material as that of the light blocking portion. A thickness of the light transmitting portion taken along a vertical direction in a cross section is less than a thickness of the light blocking portion taken along the vertical direction in the cross section.

In an exemplary embodiment, the display panel may further include a gate metal pattern disposed on the first substrate.

In an exemplary embodiment, the light transmitting portion may be overlapped with the gate metal pattern in a plan view.

In an exemplary embodiment, a width of the light transmitting portion taken along a horizontal direction in a cross section may be less than a width of the gate metal pattern.

In an exemplary embodiment, an optical density of the light blocking pattern may be greater than about 1 and less than about 4.

In an exemplary embodiment, the second substrate may further include a first color filter having a first color, a second color filter having a second color filter different from the first color and a third color filter which is transparent.

In an exemplary embodiment, the first color may be red. The second color may be green.

In an exemplary embodiment, where the light blocking pattern may be provided by using a slit mask or a half tone mask.

In an exemplary embodiment of a display apparatus according to the invention, the display apparatus includes a display panel and a light source part configured to provide light to the display panel. The display panel includes a first substrate, a second substrate facing the first substrate, and a liquid crystal layer interposed between the first substrate and the second substrate. The second substrate has a light blocking pattern including a light blocking portion and a light transmitting portion. The light blocking portion is disposed in a display area and a peripheral area surrounding the display area. The light transmitting portion is disposed in the peripheral area. The light transmitting portion includes material the same as the light blocking portion. A thickness of the light transmitting portion taken along a vertical direction in a cross section is less than a thickness of the light blocking portion. The liquid crystal layer is interposed between the first substrate and the second substrate.

In an exemplary embodiment, the second substrate may further include a first color filter having a first color, a second color filter having a second color filter different from the first color and a third color filter which is transparent.

In an exemplary embodiment, the light source part may include a first light source generating a first light having a mixed color of the first color and the second color and a second light source generating a second light having a third color.

In an exemplary embodiment, the first light source and the second light source may be configured to be alternately turned on.

In an exemplary embodiment, the mixed color may be yellow, and the third color may be blue.

In an exemplary embodiment, the mixed color may be magenta, and the third color may be green.

In an exemplary embodiment, the mixed color may be cyan, and the third color may be red.

In an exemplary embodiment, the display apparatus may further include a gate metal pattern disposed on the first substrate.

In an exemplary embodiment, the light transmitting portion may be overlapped with the gate metal pattern in a plan view.

In an exemplary embodiment, a width of the light transmitting portion may be less than a width of the gate metal pattern.

In an exemplary embodiment, an optical density of the light blocking pattern may be greater than about 1 and less than about 4.

In an exemplary embodiment, the light blocking pattern may be provided by using a slit mask or a half tone mask.

According to the invention as explained above, a display panel includes a light transmitting portion of a light-blocking pattern disposed in the peripheral region SPA. Thus, particles of fluorescence may be transmitted through the light transmitting portion, so that a reactive mesogen may be hardened by particles of fluorescence. Therefore, a quality of a display apparatus may be improved.

In addition, a light transmitting portion of a light-blocking pattern is not entirely opened. Thus, a light from a light source may be blocked effectively.

BRIEF DESCRIPTION OF THE DRAWINGS

The above and other features and advantages of the invention will become more apparent by describing in detailed exemplary embodiments thereof with reference to the accompanying drawings, in which:

FIG. 1 is a plan view illustrating an exemplary embodiment of a display panel according to the invention;

DETAILED DESCRIPTION

Figure 2:
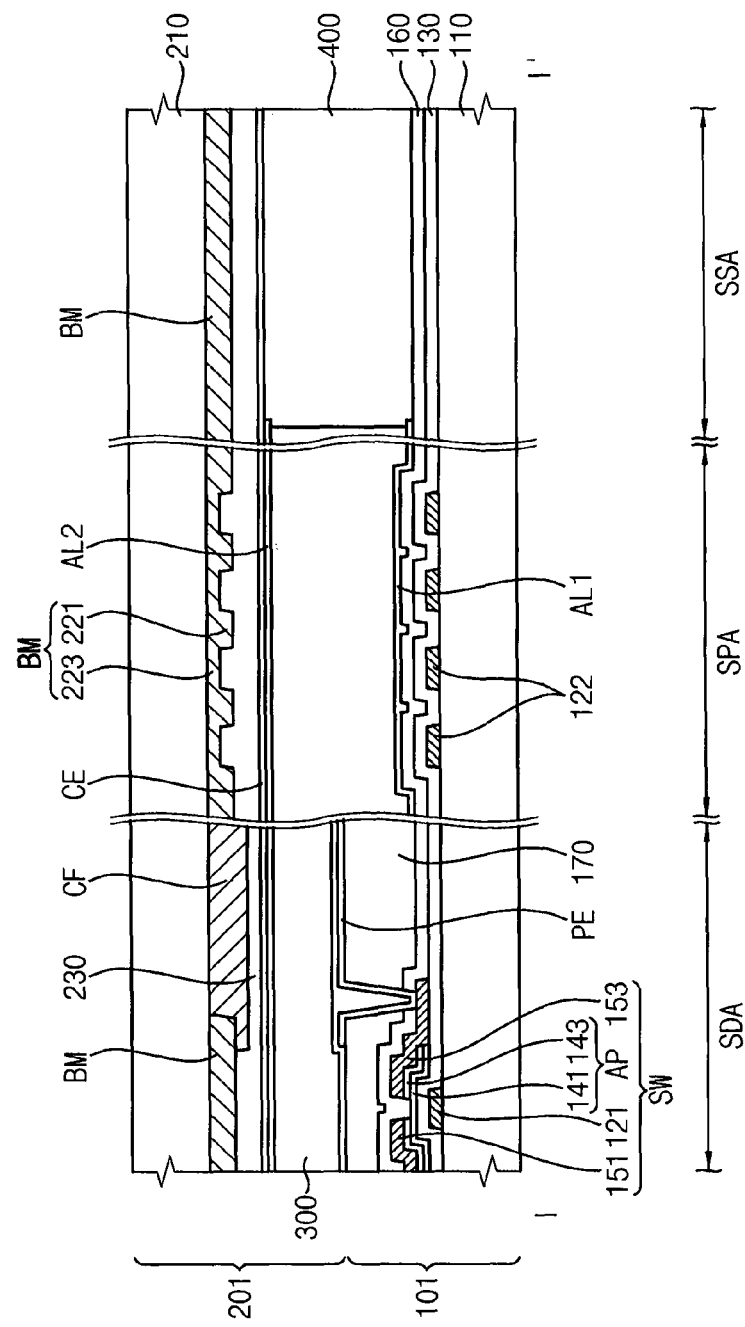
FIG. 2 is a cross-sectional view taken along line I-I' of FIG. 1.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

FIG. 1 is a plan view illustrating an exemplary embodiment of a display panel according to the invention. FIG. 2 is a cross-sectional view taken along line I-I' of FIG. 1.

Referring to FIGS. 1 and 2, a display panel 10 includes a display area DA, a peripheral area PA of the display area DA and a seal line forming area SA surrounding the peripheral area PA in an outline of the peripheral area PA.

In an exemplary embodiment, the display panel 10 has a quadrilateral shape including four sides connected to each other, for example. A point at which two sides of the four sides cross each other is defined as a vertex of the display panel 10. In an exemplary embodiment, the display area DA and the display panel 10 may have similar shapes. In an exemplary embodiment, the display area DA has a quadrilateral shape, for example.

The display area DA includes a plurality of pixels. The pixels are arranged in a first direction D1 of the display panel 10 and a second direction D2 different from the first direction D1 to have a matrix shape. The first direction D1 may be substantially perpendicular to the second direction D2. The pixels may include a pixel electrode PE, a color filter CF, a common electrode CE and a liquid crystal layer 300.

The peripheral area PA is an area of the display panel 10 surrounding the display area DA. The peripheral area PA may be divided to four sub areas. A metal pattern 122 may be disposed in the peripheral area PA. The metal pattern 122 includes substantially the same metal layer as a gate electrode 121. In an exemplary embodiment, the metal pattern 122 may include an antistatic pattern preventing a static electricity from being flowed into the display area DA or include a signal line pattern applying a driving signal and/or a control signal to the display area DA.

The seal line forming area SA is an area surrounding the peripheral area PA of the display panel 10. A sealing member 400 may be disposed in the seal line forming area SA. The sealing member 400 may surround the peripheral area PA along the seal line forming area SA to have a looped curve. The sealing member 400 straightly extends along the first direction D1 or the second direction D2 at the four sides of the display panel 10. A corner portion of the sealing member 400 has a curvature to surround the peripheral area PA.

The display panel 10 includes a first display substrate 101, a second display substrate 201, the liquid crystal layer 300 and the sealing member 400. The sealing member 400 combines the first display substrate 101 with the second display substrate 201, and seals the liquid crystal layer 300 between the first and second display substrates 101 and 201.

A first base substrate 110 of the first display substrate 101 and a second base substrate 210 of the second display substrate 201 include a display region SDA corresponding to the display area DA shown FIG. 1, a peripheral region SPA corresponding to the peripheral area PA shown FIG. 1 and a seal line region SSA corresponding to the seal line forming area SA shown FIG. 1.

The first display substrate 101 includes a switching element SW, an organic insulating layer 170, a color filter CF, a pixel electrode PE, a metal pattern 122 and a first alignment layer AL1. The switching element SW, the color filter CF and the pixel electrode PE may be disposed in the display region SDA. The metal pattern 122 may be disposed in the peripheral region SPA. The first alignment layer AL1 may be disposed in the display region SDA and the peripheral region SPA.

The switching element SW includes a gate electrode 121, an active pattern AP, a source electrode 151 and a drain electrode 153.

The gate electrode 121 is connected to a gate line (not shown) extending along the first direction D1 of the display region SDA. The gate electrode 121 is disposed on the first base substrate 110. In an exemplary embodiment, the gate electrode 121 may include a single layer structure including copper (Cu), silver (Ag), chrome (Cr), molybdenum (Mo), aluminum (Al), titanium (Ti), manganese (Mn) and any combinations thereof. In addition, the gate electrode 121 may include a multi layer structure including a plurality of layers including materials different from each other. In an exemplary embodiment, the gate electrode 121 may include a copper layer and a titanium layer disposed on and/or under the copper layer, for example. A cross-sectional structure of the gate line is substantially the same as the gate electrode 121.

The first insulation layer 130 is disposed on the gate electrode 121. The first insulation layer 130 may cover the base substrate 110 and a first conductive pattern including the gate electrode 121. In an exemplary embodiment, the first insulation layer 130 may include inorganic material such as silicon oxide (SiOx) and/or silicon nitride (SiNx), for example. In an exemplary embodiment, the first insulation layer 130 includes silicon oxide (SiOx), and may have thickness about 500 angstroms (Å), for example. In an exemplary embodiment, the first insulation layer 130 may include a plurality of layers including materials different from each other.

The active pattern AP is disposed on a gate insulating layer 130 which is disposed on the gate electrode 121. The active pattern AP includes a semiconductor layer 141 which substantially functions as a channel of the switching element SW and an ohmic contact layer 143 disposed on the semiconductor layer 141. The source electrode 151 is connected to a data line (not shown) extending along the second direction D2 and crossing the gate line. A cross-sectional structure of the data line is substantially the same as the source electrode 151.

The source electrode 151 and the drain electrode 153 may be disposed on the active pattern AP. The source electrode 151 and the drain electrode 153 may be spaced apart from each other.

In an exemplary embodiment, the source electrode 151 and the drain electrode 153 may include a single layer structure including copper (Cu), silver (Ag), chrome (Cr), molybdenum (Mo), aluminum (Al), titanium (Ti), manganese (Mn) and any combinations thereof. In another exemplary embodiment, the source electrode 151 and the drain electrode 153 may have a multi layer structure including a plurality of layers including materials different from each other. In an exemplary embodiment, the source electrode 151 and the drain electrode 153 may include a copper layer and a titanium layer disposed on and/or under the copper layer.

A second insulation layer 160 may be disposed on the source electrode 151 and the drain electrode 153. In an exemplary embodiment, the second insulation layer 160 may include a material including silicon oxide (SiOx) or silicon nitride (SiNx), for example.

The organic insulating layer 170 is disposed on second insulation layer 160 covering the switching element SW. The organic insulating layer 170 may planarize a display region SDA. The pixel electrode PE and the first alignment layer AL1 are disposed on the organic insulating layer 170.

In an exemplary embodiment, the first alignment layer AL1 may include a polyimide based compound, a polyamic acid based compound, or a combination thereof. In an exemplary embodiment, the first alignment layer AL1 may extend into the seal line region SSA. However, an adhesive strength between the first alignment layer AL1 and the sealing member 400 is weak so that an area in the seal line region SSA covered by the first alignment layer AL1 may be narrower than an area in which the first alignment layer AL1 is not provided.

The second display substrate 201 includes a light-blocking pattern BM, a color filter CF, an overcoating layer 230, a common electrode CE and a second alignment layer AL2.

The light-blocking pattern BM is disposed on the second display substrate 201. In an exemplary embodiment, the light-blocking pattern BM may include a photosensitive composition including a pigment or a dye. The light-blocking pattern BM may include a light blocking portion 221 and a light transmitting portion 223. In an exemplary embodiment, an optical density of the light blocking pattern BM may be greater than about 1 and less than about 4, for example.

The light blocking portion 221 may block light to improve a definition of a panel. The light blocking portion 221 may be disposed in the peripheral region SPA. The light transmitting portion 223 may be disposed in a position corresponding to a position of the metal pattern 122. The metal pattern 122 may block light from the light source. Thus, a width of the light transmitting portion 223 may be less than a width of the metal pattern 122. A thickness of the light transmitting portion 223 taken along a vertical direction in a cross section may be less than a thickness of the light blocking portion 221. In a process of an ultraviolet ("UV") radiation, particles of fluorescence may be transmitted through the light transmitting portion 223. A reactive mesogen may be hardened by particles of fluorescence so that a faulty of liquid crystal may be prevented. In an exemplary embodiment, the light transmitting portion 223 may be provided by using a slit mask or a half tone mask.

The color filter CF is provided in a unit region divided by the light-blocking pattern BM. A region in which the color filter CF is provided may correspond to a region in which the pixel electrode PE is provided.

The overcoating layer 230 is disposed on the second base substrate 210 on which the light-blocking pattern BM and the color filter CF are provided. The overcoating layer 230 may minimize a stepped portion between a surface of a region in which the light-blocking pattern BM and the color filter CF are provided and a surface of the second base substrate 210. In addition, the overcoating layer 230 may prevent impurities generated from the light-blocking pattern BM from being flowed into the liquid crystal layer 300. In another exemplary embodiment, the overcoating layer 230 may not be provided in the second base substrate 210 and may be omitted in the second base substrate 210.

The common electrode CE is disposed on the overcoating layer 230. In an exemplary embodiment, the common electrode CE is disposed on an entire surface of the second base substrate 210. A vertical electric field is generated between the common electrode CE and the pixel electrode PE.

The second alignment layer AL2 is disposed on the common electrode CE. The second alignment layer AL2 may be disposed in the display region SDA and the peripheral region SPA.

In an exemplary embodiment, the second alignment layer AL2 may include a polyimide based compound, a polyamic acid based compound, or a combination thereof. The second alignment layer AL2 may extend into the seal line region SSA. However, an adhesive strength between the second alignment layer AL2 and the sealing member 400 is weak so that an area in the seal line region SSA covered by the second alignment layer AL2 may be narrower than an area in which the second alignment layer AL2 is not provided.

The sealing member 400 may be interposed in the seal line regions SSA. The sealing member 400 partially overlaps with the first and second alignment layers AL1 and AL2 in a region adjacent to the peripheral regions SPA in a plan view. The sealing member 400 combines the first display substrate 101 with the second display substrate 201, and seals the liquid crystal layer 300 between the first and second display substrates 101 and 201.

FIGS. 3 to 6 are cross-sectional views illustrating a method of manufacturing a first display substrate of FIG. 2.

Figure 3:
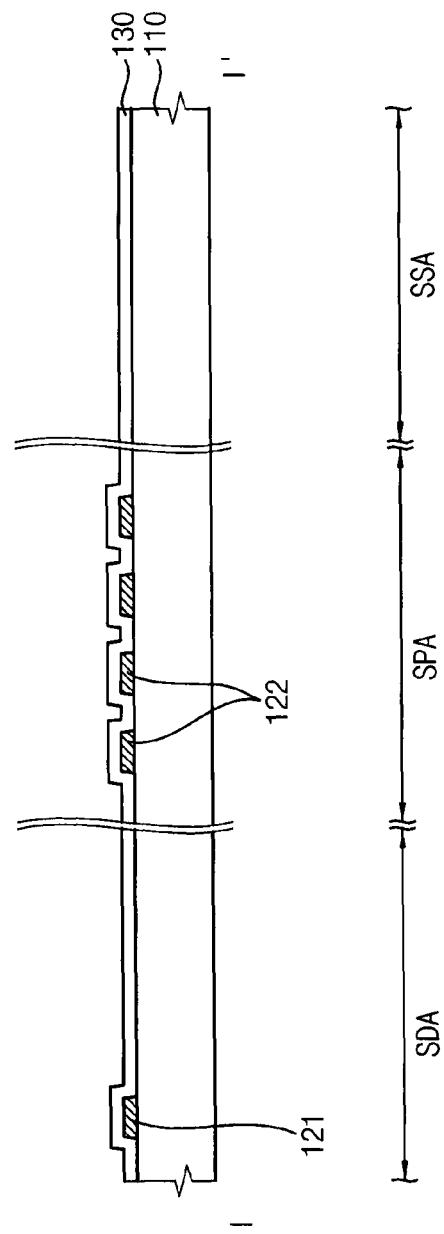
FIGS. 3 to 6 are cross-sectional views illustrating a method of manufacturing a first display substrate of FIG. 2.

Referring to FIG. 3, a gate pattern and a first insulation layer 130 are disposed on the first base substrate 110. The gate pattern includes a gate electrode 121, a gate line connected with the gate electrode 121 and gate metal pattern 122.

The gate electrode 121 may be disposed on the first base substrate 110. In an exemplary embodiment, the gate electrode 121 may have a single layer structure including copper (Cu), silver (Ag), chrome (Cr), molybdenum (Mo), aluminum (Al), titanium (Ti), manganese (Mn) and any combinations thereof. In another exemplary embodiment, the gate electrode 121 may have a multi layer structure including a plurality of layers including materials different from each other. In an exemplary embodiment, the gate electrode 121 may include a copper layer and a titanium layer disposed on and/or under the copper layer.

In an exemplary embodiment, the gate metal pattern 122 may have a single layer structure including copper (Cu), silver (Ag), chrome (Cr), molybdenum (Mo), aluminum (Al), titanium (Ti), manganese (Mn) and any combinations thereof. In another exemplary embodiment, the gate metal pattern 122 may have a multi layer structure including a plurality of layers including materials different from each other. In an exemplary embodiment, the gate metal pattern 122 may include a copper layer and a titanium layer disposed on and/or under the copper layer.

The first insulation layer 130 may cover the gate electrode 121 and the gate metal pattern 122. In an exemplary embodiment, the first insulation layer 130 may include inorganic material such as silicon oxide (SiOx) and/or silicon nitride (SiNx), for example. In an exemplary embodiment, the first insulation layer 130 includes silicon oxide (SiOx), and may have thickness about 500 Å, for example. In an exemplary embodiment, the first insulation layer 130 may include a plurality of layers including materials different from each other.

Figure 4:
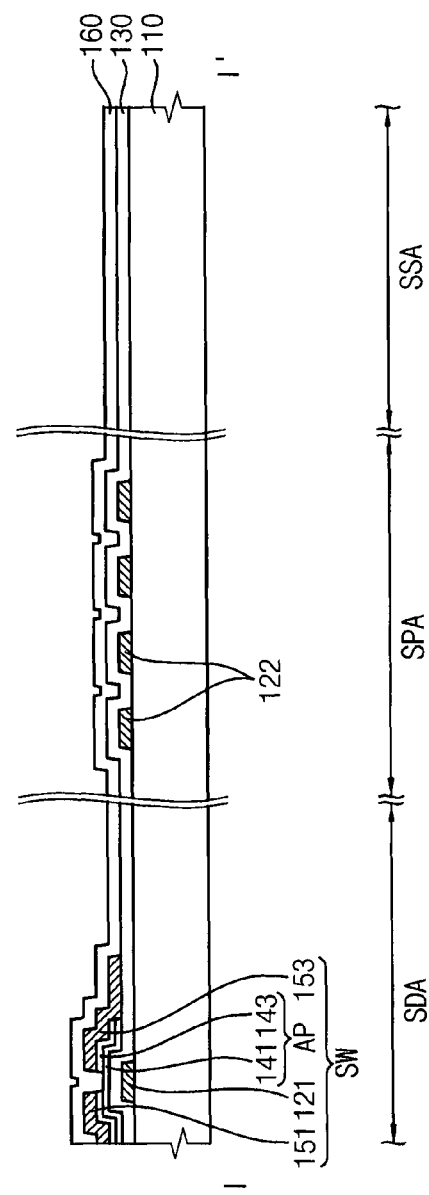

Referring to FIG. 4, an active pattern AP, a source electrode 151, a drain electrode 153 and a second insulation layer 160 are disposed on the first base substrate 110 on which the first insulation layer 130 is provided.

The active pattern AP is disposed on the first insulation layer 130. The active pattern AP is disposed on the first insulation layer 130 in an area on which the gate electrode 121 is provided. The active pattern AP overlaps with the gate electrode 121 in a plan view. The active pattern AP partially overlaps with the source electrode 151 and the drain electrode 153 in a plan view. The active pattern AP is interposed between the gate electrode 121 and the source electrode 151. In addition, the active pattern AP is interposed between the gate electrode 121 and the drain electrode 153.

The active pattern AP may include a semiconductor layer 141 and an ohmic contact layer 143 disposed on the semiconductor layer 141. In an exemplary embodiment, the semiconductor layer 141 may include a silicon semiconductor material. In an exemplary embodiment, the semiconductor layer 141 may include amorphous silicon (a–Si:H), for example. The ohmic contact layer 143 may be interposed between the semiconductor layer 141 and the source electrode 151, and may be interposed between the semiconductor layer 141 and the drain electrode 153. In an exemplary embodiment, the ohmic contact layer 143 may include n+ amorphous silicon (n+ a-Si:H), for example.

The source electrode 151 and the drain electrode 153 may be disposed on the active pattern AP. The source electrode 151 and the drain electrode 153 may be apart from each other.

In an exemplary embodiment, the source electrode 151 and the drain electrode 153 may have a single layer structure including copper (Cu), silver (Ag), chrome (Cr), molybdenum (Mo), aluminum (Al), titanium (Ti), manganese (Mn) and any combinations thereof. In an exemplary embodiment, the source electrode 151 and the drain electrode 153 may have a multi layer structure including a plurality of layers including materials different from each other. In an exemplary embodiment, the source electrode 151 and the drain electrode 153 may include a copper layer and a titanium layer disposed on and/or under the copper layer.

The second insulation layer 160 may be provided to cover the source electrode 151 and the drain electrode 153. In an exemplary embodiment, the second insulation layer 160 may include inorganic material such as silicon oxide (SiOx) and/or silicon nitride (SiNx), for example. In an exemplary embodiment, the second insulation layer 160 includes silicon oxide (SiOx), and may have thickness about 500 Å, for example. In an exemplary embodiment, the second insulation layer 160 may include a plurality of layers including materials different from each other.

Figure 5:
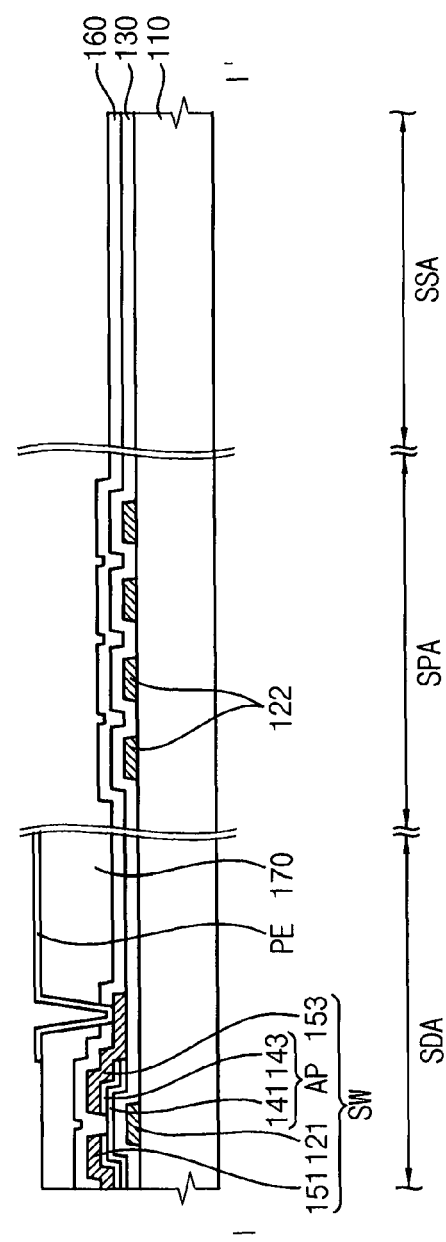

Referring to FIG. 5, after an organic layer is disposed on the second insulation layer 160, the organic layer is patterned to provide an organic insulation layer 170. The organic insulating layer 170 may planarize a display region SDA. The pixel electrode PE and the first alignment layer AL1 (refers to FIG. 6) may be disposed on the organic insulating layer 170.

The pixel electrode PE may be disposed on the organic insulating layer 170. In an exemplary embodiment, the pixel electrode PE may include a transparent conductive material, such as indium tin oxide ("ITO"), indium zinc oxide ("IZO") or etc. In an exemplary embodiment, the pixel electrode PE may include titanium (Ti) and/or molybdenum titanium (MoTi), for example.

Figure 6:
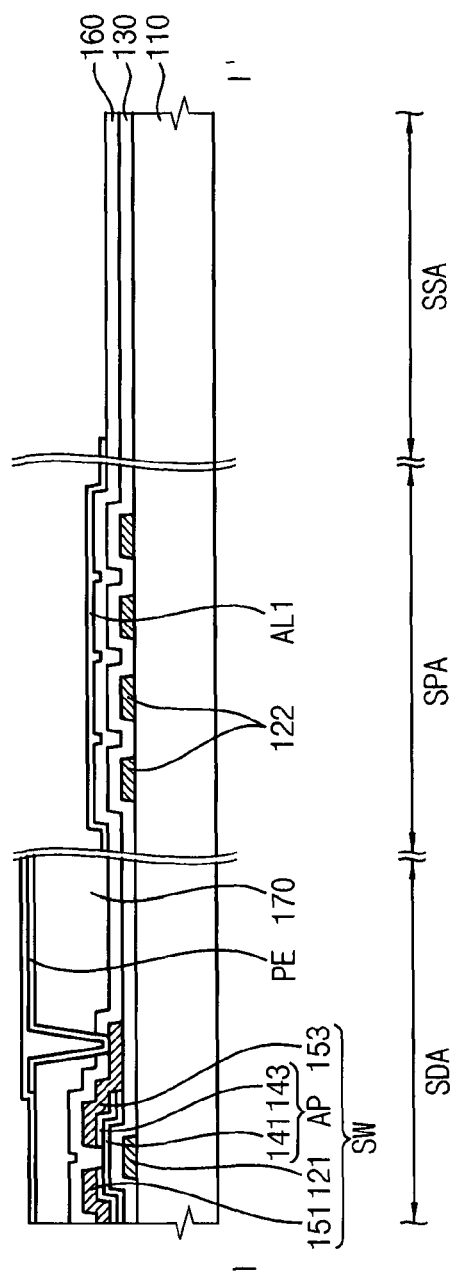

Referring to FIG. 6, the first alignment layer AL1 may be disposed on the first base substrate 110 on which the pixel electrode PE is provided. The first alignment layer AL1 may be provided in the display region SDA and the peripheral region SPA. In an exemplary embodiment, the first alignment layer AL1 may include a polyimide based compound, a polyamic acid based compound, or a combination thereof. In an exemplary embodiment, the first alignment layer AL1 may extend into the seal line region SSA. However, an adhesive strength between the first alignment layer AL1 and the sealing member 400 is weak so that an area in the seal line region SSA covered by the first alignment layer AL1 may be narrower than an area in which the first alignment layer AL1 is not provided.

Figure 7:
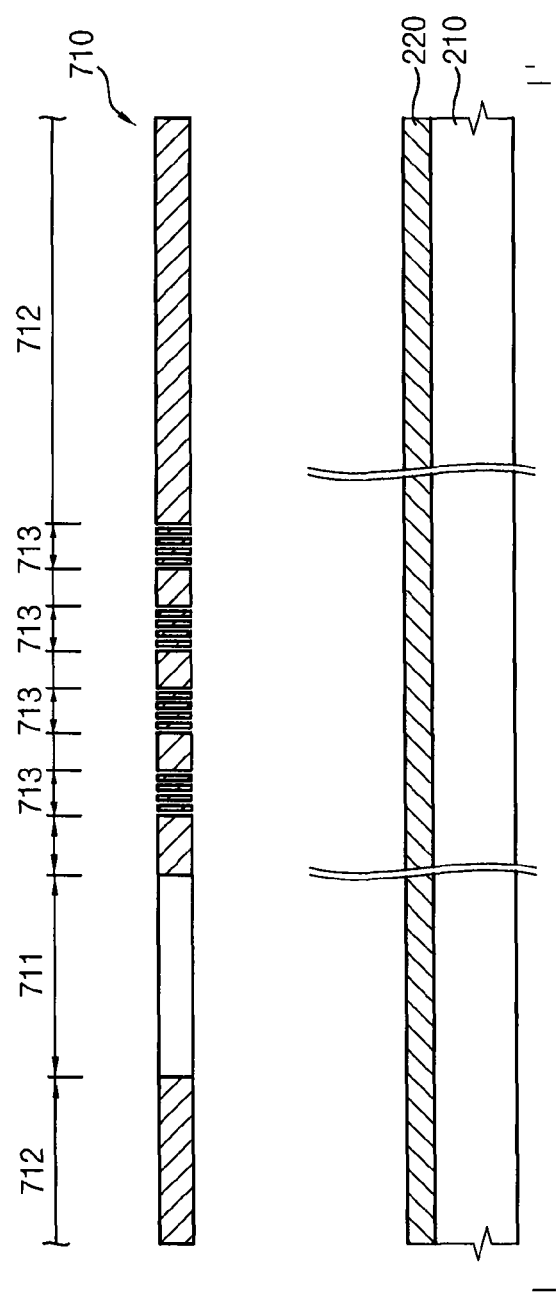
FIGS. 7 and 12 are cross-sectional views illustrating a method of manufacturing a second display substrate of FIG. 2.
Figure 12:
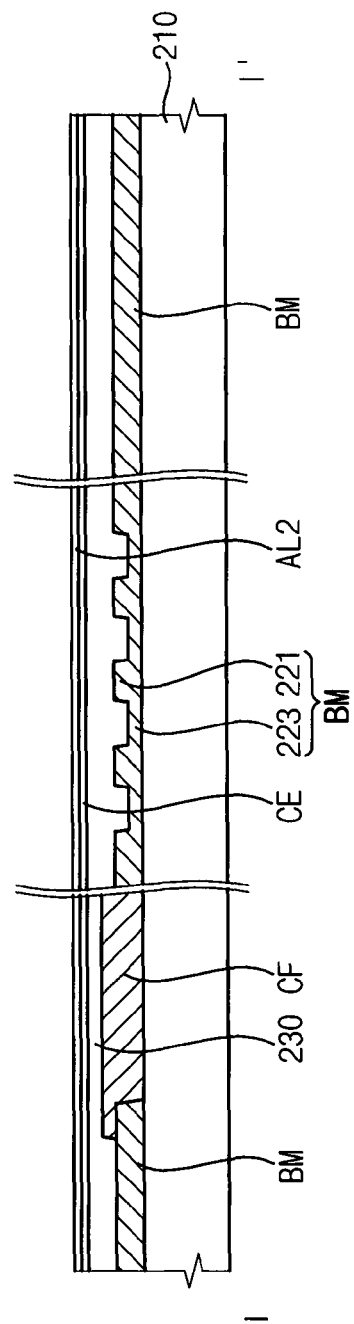

FIGS. 7 and 12 are cross-sectional views illustrating a method of manufacturing a second display substrate of FIG. 2.

Referring to FIG. 7, a light-blocking layer 220 is disposed on the second base substrate 210. Thereafter, a first mask 710 is disposed on the light-blocking layer 220. In an exemplary embodiment, the light-blocking layer 220 may include a photosensitive composition including a pigment or a dye.

The first mask 710 may include a light transmitting area 711, a light blocking area 712 and a slit area 713. Referring to FIGS. 2 and 7, the light transmitting area 711 may be corresponded to an area on which the color filter CF is provided. The light blocking area 712 may be corresponded to an area on which the light blocking portion 221 is provided. The slit area 713 may be corresponded to an area on which the light transmitting portion 223 is provided.

The light transmitting portion 223 may be provided in the peripheral region SPA. The light transmitting portion 223 may be disposed in a position corresponding to a position of the metal pattern 122. The metal pattern 122 may block light from the light source. Thus, a width of the light transmitting portion 223 taken along a horizontal direction in a cross section may be less than a width of the metal pattern 122. A thickness of the light transmitting portion 223 taken along a vertical direction in a cross section may be less than a thickness of the light blocking portion 221.

Figure 8:
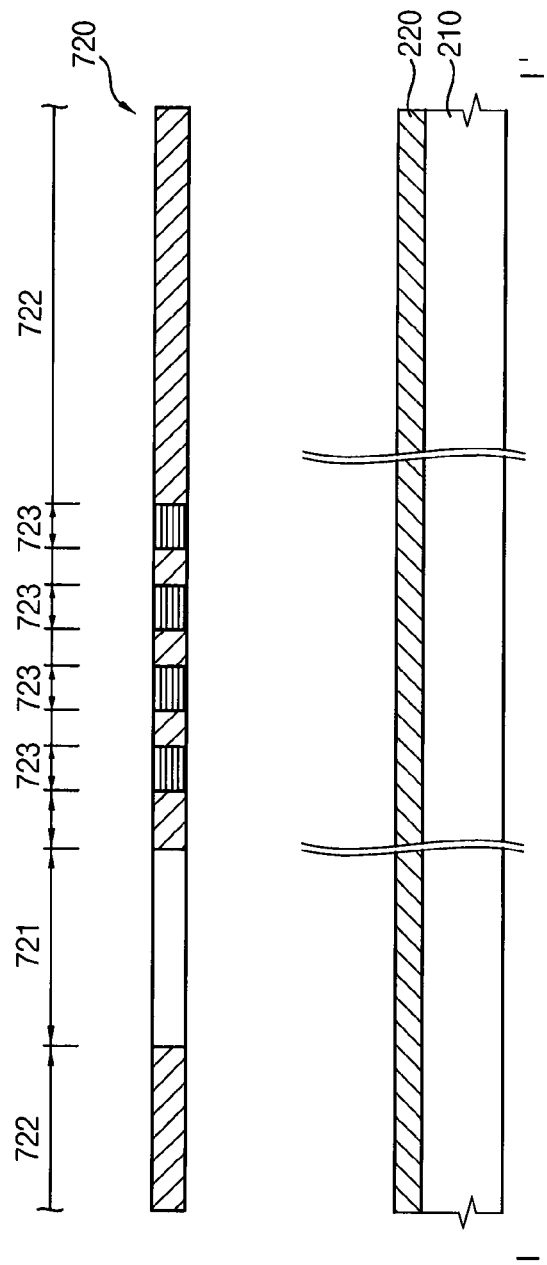

Referring to FIG. 8, a light-blocking layer 220 is disposed on the second base substrate 210. Thereafter, a second mask 720 is disposed on the light-blocking layer 220. In an exemplary embodiment, the light-blocking layer 220 may include a photosensitive composition including a pigment or a dye. The second mask 720 may include a semi light transmitting area 723 instead of the slit area 713 of the first mask 710.

The second mask 720 may include a light transmitting area 721, a light blocking area 722 and a semi light transmitting area 723. Referring to FIGS. 2 and 8, the light transmitting area 721 may be corresponded to an area on which the color filter CF is provided. The light blocking area 722 may be corresponded to an area on which the light blocking portion 221 is provided. The semi light transmitting area 723 may be corresponded to an area on which the light transmitting portion 223 is provided.

The light transmitting portion 223 may be provided in the peripheral region SPA. The light transmitting portion 223 may be disposed in a position corresponding to a position of the metal pattern 122. The metal pattern 122 may block light from the light source. Thus, a width of the light transmitting portion 223 taken along a horizontal direction in a cross section may be less than a width of the metal pattern 122. A thickness of the light transmitting portion 223 taken along a vertical direction in a cross section may be less than a thickness of the light blocking portion 221.

Figure 9:
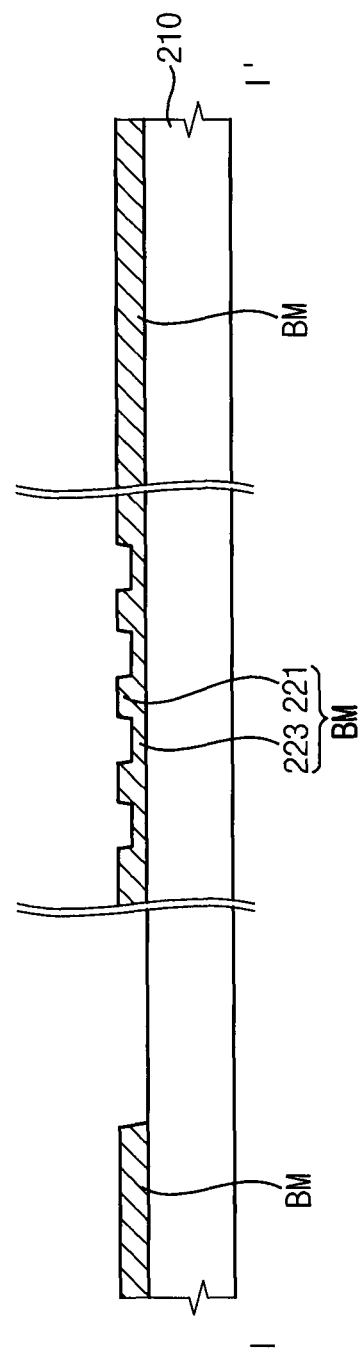

Referring to FIG. 9, a light-blocking pattern BM is disposed on the second base substrate 210.

Referring to FIGS. 2 and 9, the light-blocking pattern BM may be provided in an area in which the color filter CF does not include the display region SDA. The light-blocking pattern BM may include a light blocking portion 221 and a light transmitting portion 223. The light blocking portion 221 may block light to improve a definition of a panel. The light blocking portion 221 may be disposed in the peripheral region SPA. The light transmitting portion 223 may be disposed in a position corresponding to a position of the metal pattern 122. The metal pattern 122 may block light from the light source. Thus, a width of the light transmitting portion 223 taken along a horizontal direction in a cross section may be less than a width of the metal pattern 122. A thickness of the light transmitting portion 223 taken along a vertical direction in a cross section may be less than a thickness of the light blocking portion 221. In a process of an UV radiation, particles of fluorescence may be transmitted through the light transmitting portion 223. A reactive mesogen may be hardened by particles of fluorescence.

Figure 10:
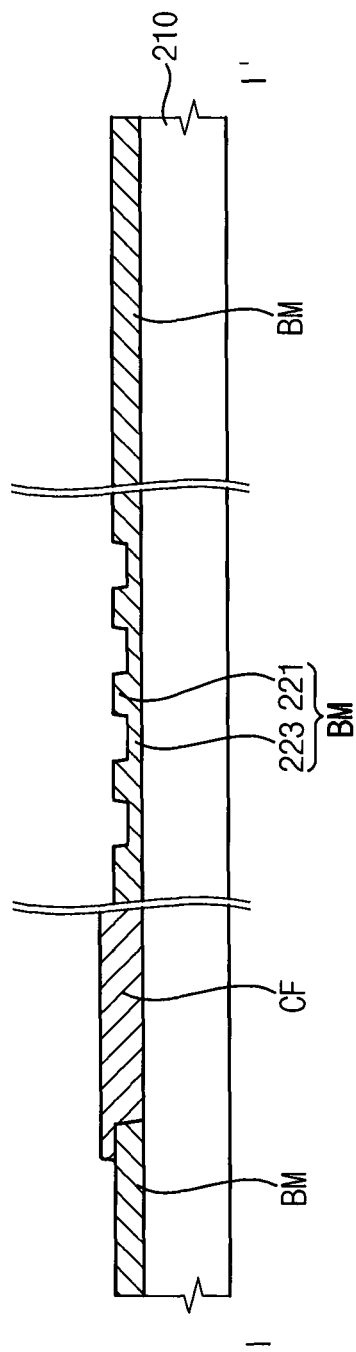

Referring to FIG. 10, the color filter CF is disposed on the light-blocking pattern BM.

In an exemplary embodiment, the color filter CF may include a first color filter having a first color, a second color filter having a second color filter different from the first color and a third color filter which is transparent. In an exemplary embodiment, the transparent color filter may be a substantially empty space at which any color filter is not disposed. In an exemplary embodiment, the first color may be red and the second color may be green, for example.

Figure 11:
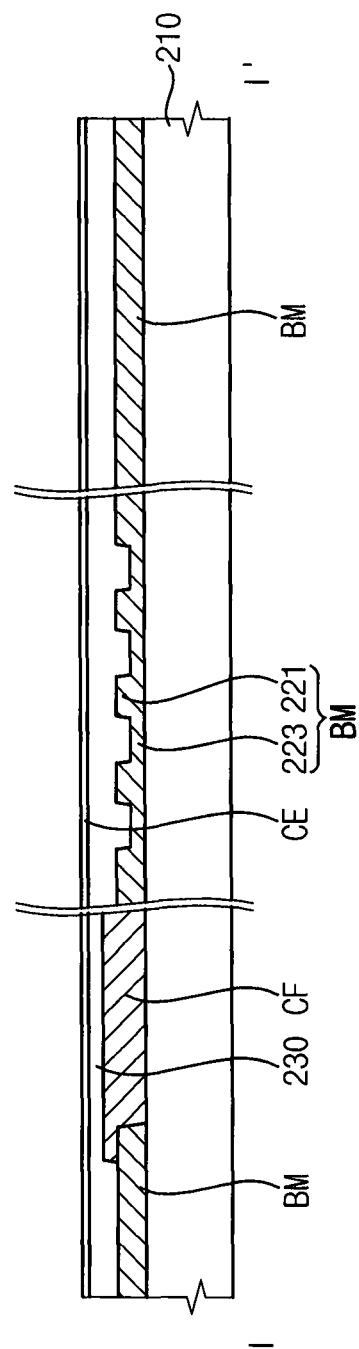

Referring to FIG. 11, an overcoating layer 230 and a common electrode CE are disposed on the second base substrate 210 on which the color filter CF is provided.

The overcoating layer 230 is disposed on the second base substrate 210 on which the light-blocking pattern BM is provided. The overcoating layer 230 may minimize a stepped portion between a surface of a region in which the light-blocking pattern BM is disposed and a surface of the second base substrate 210. In an exemplary embodiment, the overcoating layer 230 may prevent impurities generated from the light-blocking pattern BM from being flowed into the liquid crystal layer 300. In another exemplary embodiment, the overcoating layer 230 may not be provided in the second base substrate 210 and may be omitted in the second base substrate 210.

The common electrode CE is disposed on the overcoating layer 230. The common electrode CE is disposed on an entire surface of the second base substrate 210. A vertical electric field is generated between the common electrode CE and the pixel electrode PE. In an exemplary embodiment, the common electrode CE may include a transparent conductive material, such as ITO, IZO or etc. In addition, the common electrode CE may include titanium (Ti) and/or molybdenum titanium (MoTi), for example.

Referring to FIG. 12, a second alignment layer AL2 is disposed on the common electrode CE.

The alignment layer AL2 is disposed on the common electrode CE. The alignment layer AL2 may be provided in the display region SDA and the peripheral region SPA.

In an exemplary embodiment, the second alignment layer AL2 may include a polyimide based compound, a polyamic acid based compound, or a combination thereof. In an exemplary embodiment, the second alignment layer AL2 may extend into the seal line region SSA. However, an adhesive strength between the second alignment layer AL2 and the sealing member 400 is weak so that an area in the seal line region SSA covered by the second alignment layer AL2 may be narrower than an area in which the second alignment layer AL2 is not provided.

Figure 13:
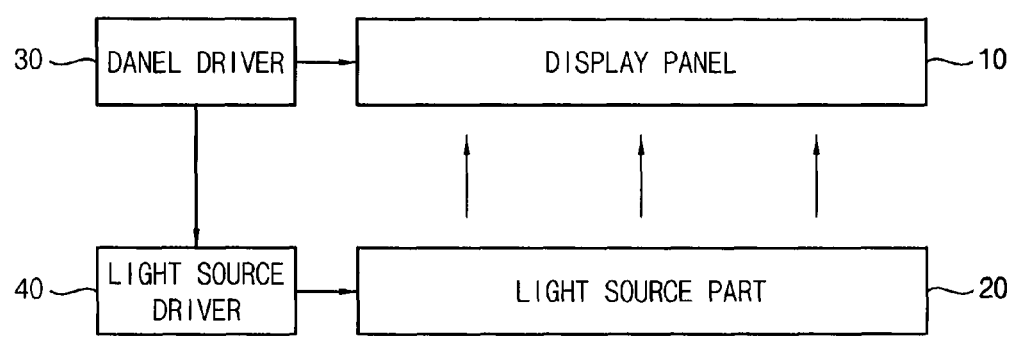
FIG. 13 is a block diagram illustrating an exemplary embodiment of a display apparatus according to the invention.
Figure 14:
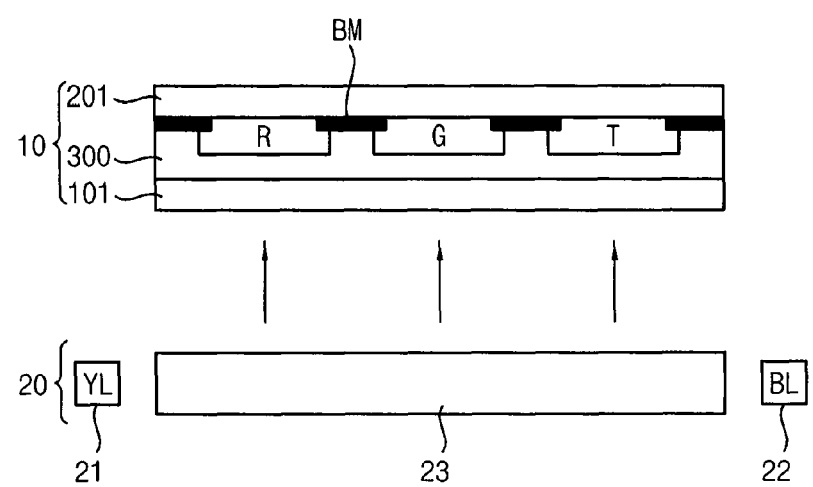
FIG. 14 is a cross-sectional view illustrating a display panel and a light source part of FIG. 13.
Figure 15:
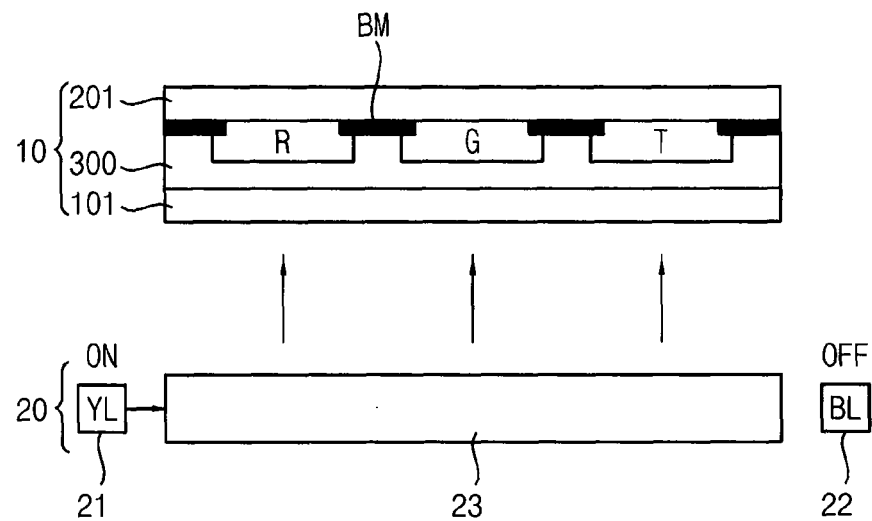
FIG. 15 is a cross-sectional view illustrating the display panel and the light source part of FIG. 13 in a first subframe.
Figure 16:
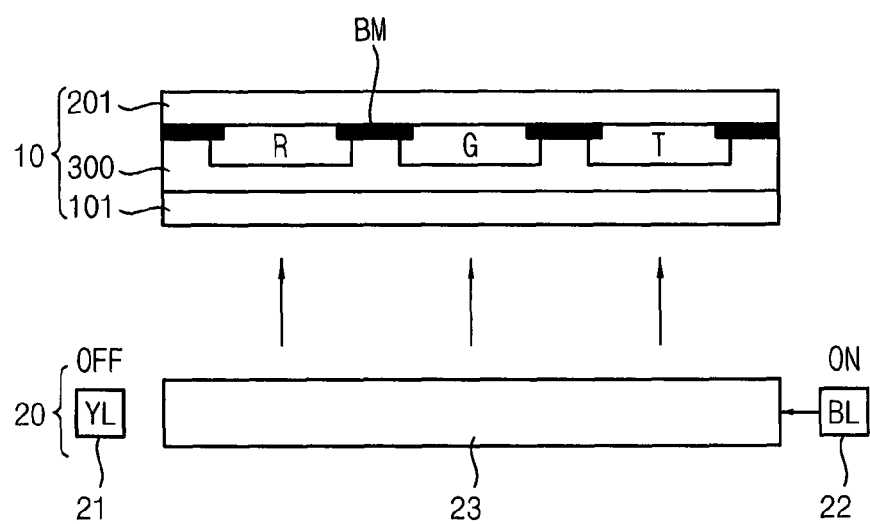
FIG. 16 is a cross-sectional view illustrating the display panel and the light source part of FIG. 13 in a second subframe.

FIG. 13 is a block diagram illustrating a display apparatus according to an exemplary embodiment of the invention. FIG. 14 is a cross-sectional view illustrating a display panel and a light source part of FIG. 13. FIG. 15 is a cross-sectional view illustrating the display panel and the light source part of FIG. 13 in a first subframe. FIG. 16 is a cross-sectional view illustrating the display panel and the light source part of FIG. 13 in a second subframe.

Referring to FIGS. 13, 14, 15 and 16, the display apparatus includes a display panel 10, a light source part 20, a panel driver 30 and a light source driver 40.

The display panel 10 displays an image. The display panel 10 includes a first substrate 101, a second substrate 201 and a liquid crystal layer 300.

In an exemplary embodiment, the display panel 10 includes a first subpixel R having a first primary color, a second subpixel G having a second primary color and a transparent subpixel T, for example.

In the illustrated exemplary embodiment, the first primary color is red, and the first subpixel R is a red subpixel, for example. In the illustrated exemplary embodiment, the second primary color is green, and the second subpixel G is a green subpixel, for example. However, the invention is not limited thereto, and the first primary and the second primary color may have various other colors.

In an exemplary embodiment, the first substrate 101 may be a thin film transistor ("TFT") substrate including a plurality of TFTs. The first substrate 101 may further include a plurality of gate lines extending in a first direction D1 (refers to FIG. 1) and a plurality of data lines extending in a second direction D2 crossing the first direction D1. The first substrate 101 may further include a pixel electrode.

The second substrate 201 faces the first substrate 101. In an exemplary embodiment, the second substrate 201 may be a color filter substrate including a plurality of color filters. In an exemplary embodiment, the second substrate 201 may further include a common electrode.

In an exemplary embodiment, the first subpixel R may be defined by a red color filter disposed on the second substrate 201. In an exemplary embodiment, the second subpixel G may be defined by a green color filter disposed on the second substrate 201. In an exemplary embodiment, the transparent subpixel T may be defined by a transparent color filter disposed on the second substrate 201. In an exemplary embodiment, the transparent color filter may be a substantially empty space at which any color filter is not disposed. A light blocking pattern BM may be disposed between the color filters.

The liquid crystal layer 300 is disposed between the first and second substrates 101 and 201.

Although the color filters are disposed on the second substrate 201 in the exemplary embodiment, the invention is not limited thereto.

The panel driver 30 is connected to the display panel 10 to drive the display panel 10. In an exemplary embodiment, the panel driver 30 may include a timing controller, a gate driver and a data driver.

The timing controller generates a first control signal to control a driving timing of the gate driver, and outputs the first control signal to the gate driver. The timing controller generates a second control signal to control a driving timing of the data driver, and outputs the second control signal to the data driver. The gate driver outputs a gate signal to the gate lines. The data driver outputs a data signal to the data lines.

The panel driver 30 sets grayscale data of the first, second and transparent subpixels R, G and T.

The panel driver 30 generates a light source control signal to control a driving timing of the light source driver 40, and outputs the light source control signal to the light source driver 40. In an exemplary embodiment, the panel driver 30 may be synchronized with the light source driver 40.

The light source part 20 includes a first light source 21 and a second light source 22. The light source part 20 may further include a light guide plate 23. The light source part 20 generates a light and provides the light to the display panel 10.

The first light source 21 generates a light having a mixed color of the first primary color and the second primary color. In the illustrated exemplary embodiment, the first primary color is red, the second primary color is green, and the mixed color of the first and second primary colors is yellow, for example.

The second light source 22 generates a light having a third primary color. The third primary color may be blue, for example.

When the first, second and third primary colors are mixed with one another, the mixed color is white. Although the first, second and third primary colors are respectively red, green and blue in the illustrated exemplary embodiment, the invention is not limited thereto.

In the illustrated exemplary embodiment, the first light source 21 may include a light emitting diode ("LED") chip which emits a yellow light, for example. The second light source 22 may include an LED chip which emits a blue light, for example. In an alternative exemplary embodiment, the first light source 21 may include a blue LED chip and a yellow phosphor, for example.

The light guide plate 23 guides light from the first and second light sources 21 and 22 to the display panel 10.

In the illustrated exemplary embodiment, the first light source 21 may be disposed in a first side of the light guide plate 23. The second light source 22 may be disposed in a second side of the light guide plate 23 opposite to the first side of the light guide plate 23.

In an alternative exemplary embodiment, the first light source 21 may be provided as one package to be disposed in a first side of the light guide plate 23.

Although the light source part 20 is an edge type light source part including the light guide plate 23 and the first and second light sources 21 and 22 disposed side portions of the light guide plate 23 in the illustrated exemplary embodiment, the invention is not limited thereto. In an alternative exemplary embodiment, the light source part 20 may include a direct type light source part including a plurality of light sources disposed under the display panel 10 and corresponding to an entire area of the display panel 10.

Although the display apparatus is the liquid crystal display ("LCD") apparatus including the liquid crystal layer 300, the invention is not limited thereto. In an alternative exemplary embodiment, the display apparatus may include organic light emitting diode ("OLED") display apparatus including the OLEDs.

The light source driver 40 drives the light source part 20. The light source driver 40 may alternately turn on the first and second light sources 21 and 22. In an exemplary embodiment, during a first subframe, the first light source 21 is turned on and the second light source 22 is turned off. In contrast, during a second subframe, the first light source 21 is turned off and the second light source 22 is turned on.

Duration of the first subframe may be substantially equal to duration of the second subframe. In an alternative exemplary embodiment, the duration of the first subframe may be different from the duration of the second subframe.

In an exemplary embodiment, the display panel 10 may display the images in a frame rate of 120 hertz (Hz), for example. The light source driver 40 may alternately turn on the first and second light sources 21 and 22 in a frequency of 120 Hz, for example.

In an exemplary embodiment, the display panel 10 may display a three-dimensional ("3D") image. In an exemplary embodiment, the display panel 10 may alternately display a left image and a right image in a frequency of 120 Hz, for example. The display panel 10 displays two left images in a row and two right images in a row. As a result, the display panel 10 displays the images in a frame rate of 240 Hz, for example. In an exemplary embodiment, the light source driver 40 may alternately turn on the first and second light sources 21 and 22 in a frequency of 240 Hz.

According to the illustrated exemplary embodiment, the display panel 10 includes red, green and transparent subpixels R, G and T and the light source part 20 includes yellow and blue light sources YL and BL which are repeatedly turned on and off so that a power consumption of the display apparatus may decrease.

Figure 17:
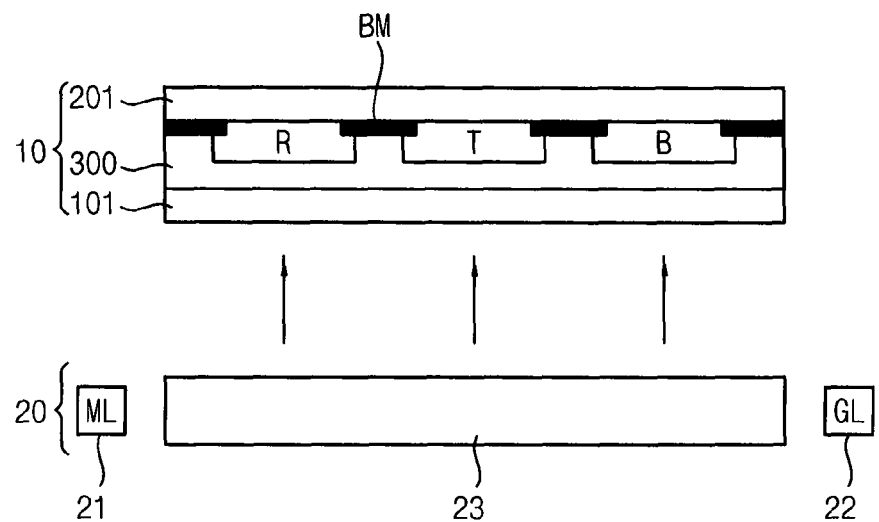
FIG. 17 is a cross-sectional view illustrating an exemplary embodiment of a display panel and a light source part of a display apparatus according to the invention.

FIG. 17 is a cross-sectional view illustrating a display panel and a light source part of a display apparatus according to an exemplary embodiment of the invention.

The display apparatus and the method of driving the same according to the illustrated exemplary embodiment are substantially the same as the display apparatus and the method of driving the same in FIGS. 13 to 16 except that a first subpixel is a red subpixel, a second subpixel is a blue subpixel, a first light source is a magenta light source and a second light source is a green light source. Thus, the same reference numerals will be used to refer to the same or like parts as those described in FIGS. 13 to 16 and any repetitive explanation concerning the above elements will be omitted.

Referring to FIGS. 13 and 17, the display apparatus includes a display panel 10, a light source part 20, a panel driver 30 and a light source driver 40.

In the illustrated exemplary embodiment, the display panel 10 includes a first subpixel R having a first primary color, a second subpixel B having a second primary color and a transparent subpixel T, for example.

In the illustrated exemplary embodiment, the first primary color is red, and the first subpixel R is a red subpixel, for example. In the illustrated exemplary embodiment, the second primary color is blue, and the second subpixel B is a blue subpixel, for example.

In the illustrated exemplary embodiment, the first subpixel R may be defined by a red color filter disposed on the second substrate 201. In the illustrated exemplary embodiment, the second subpixel B may be defined by a blue color filter disposed on the second substrate 201. In the illustrated exemplary embodiment, the transparent subpixel T may be defined by a transparent color filter disposed on the second substrate 201. In an exemplary embodiment, the transparent color filter may be a substantially empty space at which any color filter is not disposed. A light blocking pattern BM may be disposed between the color filters.

The panel driver 30 sets grayscale data of the first, second and transparent subpixels R, B and T.

The light source part 20 includes a first light source 21 and a second light source 22. The light source part 20 may further include a light guide plate 23. The light source part 20 generates a light and provides the light to the display panel 10.

The first light source 21 generates a light having a mixed color of the first primary color and the second primary color. In the illustrated exemplary embodiment, the first primary color is red, the second primary color is blue, and the mixed color of the first and second primary colors is magenta, for example.

The second light source 22 generates a light having a third primary color. In the illustrated exemplary embodiment, the third primary color may be green, for example.

The light source driver 40 drives the light source part 20. The light source driver 40 may alternately turn on the first and second light sources 21 and 22. In an exemplary embodiment, during a first subframe, the first light source 21 is turned on and the second light source 22 is turned off. In contrast, during a second subframe, the first light source 21 is turned off and the second light source 22 is turned on.

According to the illustrated exemplary embodiment, the display panel 10 includes red, blue and transparent subpixels R, B and T and the light source part 20 includes magenta and green light sources ML and GL which are repeatedly turned on and off so that a power consumption of the display apparatus may decrease.

Figure 18:
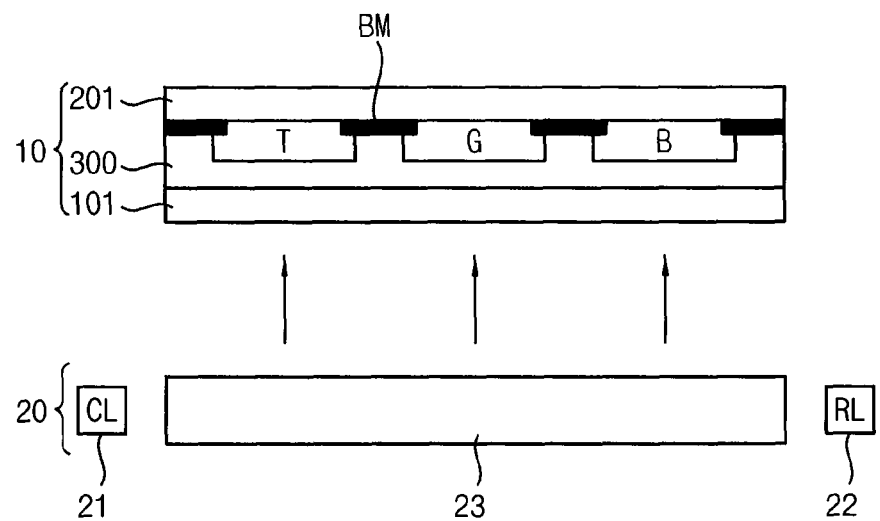
FIG. 18 is a cross-sectional view illustrating an exemplary embodiment of a display panel and a light source part of a display apparatus according to the invention.

FIG. 18 is a cross-sectional view illustrating a display panel and a light source part of a display apparatus according to an exemplary embodiment of the invention.

The display apparatus and the method of driving the same according to the illustrated exemplary embodiment are substantially the same as the display apparatus and the method of driving the same in FIGS. 13 to 16 except that a first subpixel is a green subpixel, a second subpixel is a blue subpixel, a first light source is a cyan light source and a second light source is a red light source. Thus, the same reference numerals will be used to refer to the same or like parts as those described in FIGS. 13 to 16 and any repetitive explanation concerning the above elements will be omitted.

Referring to FIGS. 13 and 18, the display apparatus includes a display panel 10, a light source part 20, a panel driver 30 and a light source driver 40.

The display panel 10 includes a first subpixel G having a first primary color, a second subpixel B having a second primary color and a transparent subpixel T.

In the illustrated exemplary embodiment, the first primary color is green, and the first subpixel G is a green subpixel, for example. In the illustrated exemplary embodiment, the second primary color is blue, and the second subpixel B is a blue subpixel, for example.

In the illustrated exemplary embodiment the first subpixel G may be defined by a green color filter disposed on the second substrate 201. In the illustrated exemplary embodiment the second subpixel B may be defined by a blue color filter disposed on the second substrate 201. In an exemplary embodiment, the transparent subpixel T may be defined by a transparent color filter disposed on the second substrate 201. In an exemplary embodiment, the transparent color filter may be a substantially empty space at which any color filter is not disposed. A light blocking pattern BM may be disposed between the color filters.

The panel driver 30 sets grayscale data of the first, second and transparent subpixels G, B and T.

The light source part 20 includes a first light source 21 and a second light source 22. The light source part 20 may further include a light guide plate 23. The light source part 20 generates a light and provides the light to the display panel 10.

The first light source 21 generates a light having a mixed color of the first primary color and the second primary color. In the illustrated exemplary embodiment, the first primary color is green, the second primary color is blue, and the mixed color of the first and second primary colors is cyan, for example.

In the illustrated exemplary embodiment, the second light source 22 generates a light having a third primary color. In the illustrated exemplary embodiment, the third primary color may be red, for example.

The light source driver 40 drives the light source part 20. The light source driver 40 may alternately turn on the first and second light sources 21 and 22. In an exemplary embodiment, during a first subframe, the first light source 21 is turned on and the second light source 22 is turned off. In contrast, during a second subframe, the first light source 21 is turned off and the second light source 22 is turned on.

According to the illustrated exemplary embodiment, the display panel 10 includes green, blue and transparent subpixels G, B and T and the light source part 20 includes cyan and red light sources CL and RL which are repeatedly turned on and off so that a power consumption of the display apparatus may decrease.

Figure 19:
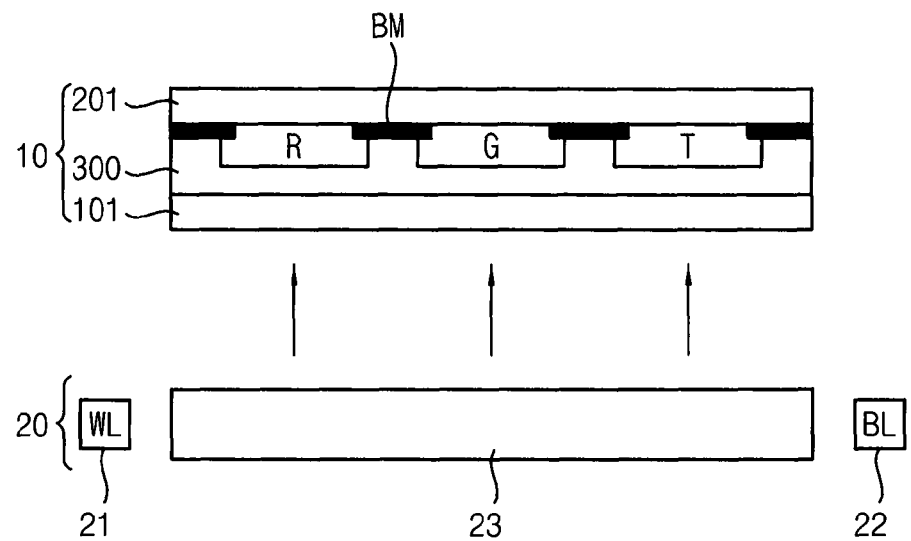
FIG. 19 is a cross-sectional view illustrating an exemplary embodiment of a display panel and a light source part of a display apparatus according to the invention.

FIG. 19 is a cross-sectional view illustrating a display panel and a light source part of a display apparatus according to an exemplary embodiment of the invention.

The display apparatus and the method of driving the same according to the illustrated exemplary embodiment are substantially the same as the display apparatus and the method of driving the same in FIGS. 13 to 16 except that a first light source is a white light source. Thus, the same reference numerals will be used to refer to the same or like parts as those described in FIGS. 13 to 16 and any repetitive explanation concerning the above elements will be omitted.

Referring to FIGS. 13 and 19, the display apparatus includes a display panel 10, a light source part 20, a panel driver 30 and a light source driver 40.

The display panel 10 includes a first subpixel R having a first primary color, a second subpixel G having a second primary color and a transparent subpixel T.

In the illustrated exemplary embodiment, the first primary color is red, and the first subpixel R is a red subpixel, for example. In the illustrated exemplary embodiment, the second primary color is green, and the second subpixel G is a green subpixel, for example.

In the illustrated exemplary embodiment, the first subpixel R may be defined by a red color filter disposed on the second substrate 201. In the illustrated exemplary embodiment, the second subpixel G may be defined by a green color filter disposed on the second substrate 201. In the illustrated exemplary embodiment, the transparent subpixel T may be defined by a transparent color filter disposed on the second substrate 201. In an exemplary embodiment, the transparent color filter may be a substantially empty space at which any color filter is not disposed. A light blocking pattern BM may be disposed between the color filters.

The panel driver 30 sets grayscale data of the first, second and transparent subpixels R, G and T.

The light source part 20 includes a first light source 21 and a second light source 22. The light source part 20 may further include a light guide plate 23. The light source part 20 generates a light and provides the light to the display panel 10.

The first light source 21 generates a white light. The second light source 22 generates a light having a third primary color. In the illustrated exemplary embodiment, the third primary color may be blue, for example.

The light source driver 40 drives the light source part 20. The light source driver 40 may alternately turn on the first and second light sources 21 and 22. In an exemplary embodiment, during a first subframe, the first light source 21 is turned on and the second light source 22 is turned off. In contrast, during a second subframe, the first light source 21 is turned off and the second light source 22 is turned on.

According to the exemplary embodiment, the display panel 10 includes red, green and transparent subpixels R, G and T and the light source part 20 includes white and blue light sources WL and BL which are repeatedly turned on and off so that a power consumption of the display apparatus may decrease.

Figure 20:
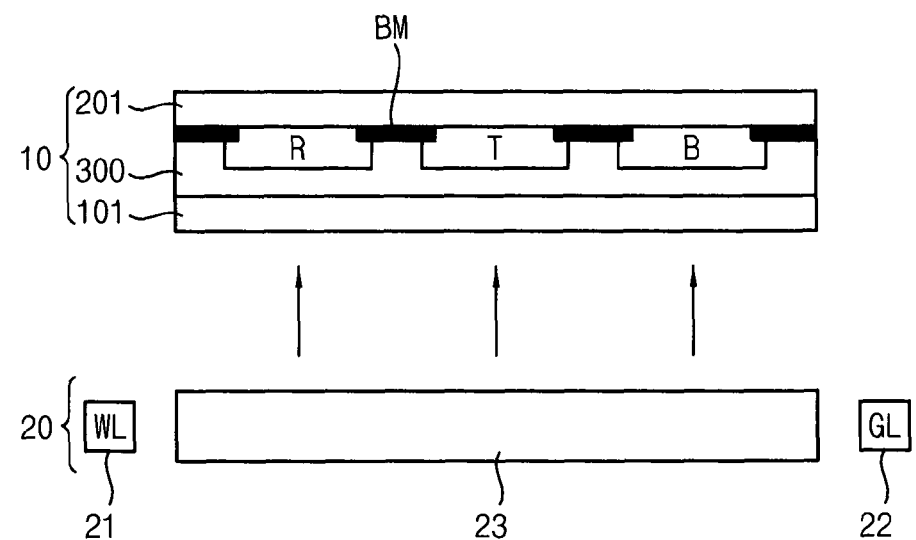
FIG. 20 is a cross-sectional view illustrating an exemplary embodiment of a display panel and a light source part of a display apparatus according to the invention.

FIG. 20 is a cross-sectional view illustrating a display panel and a light source part of a display apparatus according to an exemplary embodiment of the invention.

The display apparatus and the method of driving the same according to the illustrated exemplary embodiment are substantially the same as the display apparatus and the method of driving the same in FIG. 17 except that a first light source is a white light source. Thus, the same reference numerals will be used to refer to the same or like parts as those described in FIG. 17 and any repetitive explanation concerning the above elements will be omitted.

Referring to FIGS. 13 and 20, the display apparatus includes a display panel 10, a light source part 20, a panel driver 30 and a light source driver 40.

The display panel 10 includes a first subpixel R having a first primary color, a second subpixel B having a second primary color and a transparent subpixel T.

In the illustrated exemplary embodiment, the first primary color is red, and the first subpixel R is a red subpixel, for example. In the illustrated exemplary embodiment, the second primary color is blue, and the second subpixel B is a blue subpixel, for example.

The first subpixel R may be defined by a red color filter disposed on the second substrate 201. The second subpixel B may be defined by a blue color filter disposed on the second substrate 201. The transparent subpixel T may be defined by a transparent color filter disposed on the second substrate 201. In an exemplary embodiment, the transparent color filter may be a substantially empty space at which any color filter is not disposed. A light blocking pattern BM may be disposed between the color filters.

The panel driver 30 sets grayscale data of the first, second and transparent subpixels R, B and T.

The light source part 20 includes a first light source 21 and a second light source 22. The light source part 20 may further include a light guide plate 23. The light source part 20 generates a light and provides the light to the display panel 10.

The first light source 21 generates a white light. The second light source 22 generates a light having a third primary color. In the illustrated exemplary embodiment, the third primary color may be green, for example.

The light source driver 40 drives the light source part 20. The light source driver 40 may alternately turn on the first and second light sources 21 and 22. In an exemplary embodiment, during a first subframe, the first light source 21 is turned on and the second light source 22 is turned off. In contrast, during a second subframe, the first light source 21 is turned off and the second light source 22 is turned on.

According to the illustrated exemplary embodiment, the display panel 10 includes red, blue and transparent subpixels R, B and T and the light source part 20 includes white and green light sources WL and GL which are repeatedly turned on and off so that a power consumption of the display apparatus may decrease.

Figure 21:
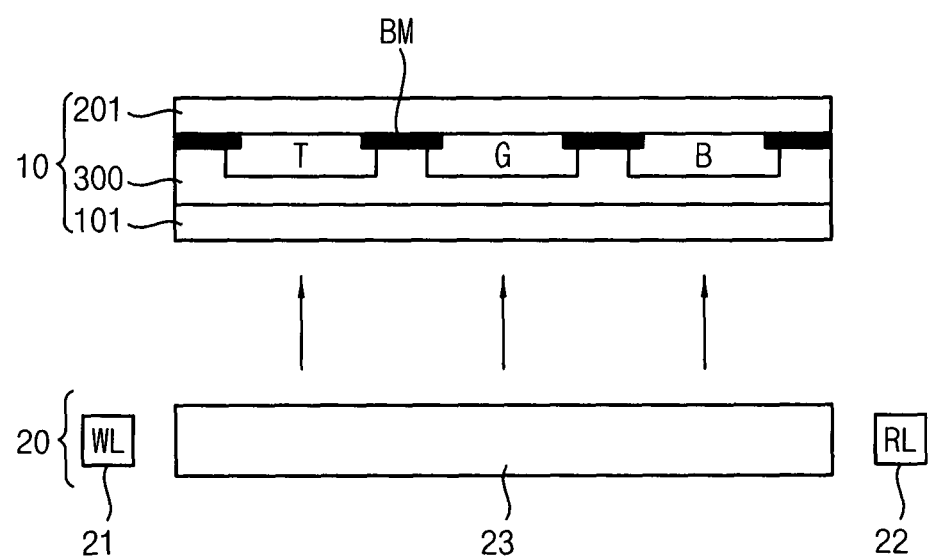
FIG. 21 is a cross-sectional view illustrating an exemplary embodiment of a display panel and a light source part of a display apparatus according to the invention.

FIG. 21 is a cross-sectional view illustrating a display panel and a light source part of a display apparatus according to an exemplary embodiment of the invention.

The display apparatus and the method of driving the same according to the illustrated exemplary embodiment are substantially the same as the display apparatus and the method of driving the same in FIG. 18 except that a first light source is a white light source. Thus, the same reference numerals will be used to refer to the same or like parts as those described in FIG. 18 and any repetitive explanation concerning the above elements will be omitted.

Referring to FIGS. 13 and 21, the display apparatus includes a display panel 10, a light source part 20, a panel driver 30 and a light source driver 40.

The display panel 10 includes a first subpixel G having a first primary color, a second subpixel B having a second primary color and a transparent subpixel T.

In the illustrated exemplary embodiment, the first primary color is green. The first subpixel G is a green subpixel. The second primary color is blue. The second subpixel B is a blue subpixel.

The first subpixel G may be defined by a green color filter disposed on the second substrate 201. The second subpixel B may be defined by a blue color filter disposed on the second substrate 201. The transparent subpixel T may be defined by a transparent color filter disposed on the second substrate 201. In an exemplary embodiment, the transparent color filter may be a substantially empty space at which any color filter is not disposed. A light blocking pattern BM may be disposed between the color filters.

The panel driver 30 sets grayscale data of the first, second and transparent subpixels G, B and T.

The light source part 20 includes a first light source 21 and a second light source 22. The light source part 20 may further include a light guide plate 23. The light source part 20 generates a light and provides the light to the display panel 10.

The first light source 21 generates a white light. The second light source 22 generates a light having a third primary color. The third primary color may be red.

The light source driver 40 drives the light source part 20. The light source driver 40 may alternately turn on the first and second light sources 21 and 22. In an exemplary embodiment, during a first subframe, the first light source 21 is turned on and the second light source 22 is turned off. In contrast, during a second subframe, the first light source 21 is turned off and the second light source 22 is turned on.

According to the illustrated exemplary embodiment, the display panel 10 includes green, blue and transparent subpixels G, B and T and the light source part 20 includes white and red light sources WL and RL which are repeatedly turned on and off so that a power consumption of the display apparatus may decrease.

According to the invention as explained above, a display panel includes a light transmitting portion of a light-blocking pattern disposed in the peripheral region SPA. Thus, particles of fluorescence may be transmitted through the light transmitting portion, so that a reactive mesogen may be hardened by particles of fluorescence. Therefore, a quality of a display apparatus may be improved.

In addition, a light transmitting portion of a light-blocking pattern is not entirely opened. Thus, a light from a light source may be blocked effectively.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display panel comprising:
a first substrate;
a second substrate which faces the first substrate and comprises:
a light blocking pattern including:
a light blocking portion disposed in a display area and a peripheral area surrounding the display area; and
a light transmitting portion which is disposed in the peripheral area and includes the same material as that of the light blocking portion, and
a liquid crystal layer interposed between the first substrate and the second substrate, the light transmitting portion overlapping the liquid crystal layer,
wherein a thickness of the light transmitting portion taken along a vertical direction in a cross section is less than a thickness of the light blocking portion taken along the vertical direction in the cross section.

2. The display panel of claim 1, further comprising a gate metal pattern disposed on the first substrate.

3. The display panel of claim 2, wherein the light transmitting portion is overlapped with the gate metal pattern in a plan view.

4. The display panel of claim 3, wherein a width of the light transmitting portion taken along a horizontal direction in a cross section is less than a width of the gate metal pattern.

5. The display panel of claim 1, wherein an optical density of the light blocking pattern is greater than about 1 and less than about 4.

6. The display panel of claim 1, wherein the second substrate further comprises:
a first color filter having a first color;
a second color filter having a second color filter different from the first color; and
a third color filter which is transparent.

7. The display panel of claim 6, wherein the first color is red and the second color is green.

8. The display panel of claim 1, wherein the light blocking pattern includes a slit mask reduced portion or a half tone mask reduced portion of light blocking pattern material.

9. A display apparatus comprising:
a display panel including:
a first substrate;
a second substrate which faces the first substrate and includes:
a light blocking pattern including:
a light blocking portion disposed in a display area and a peripheral area surrounding the display area; and
a light transmitting portion which is disposed in the peripheral area and includes the same material as that of the light blocking portion,
wherein a thickness of the light transmitting portion taken along a vertical direction in a cross section is less than a thickness of the light blocking portion taken along the vertical direction in the cross section, and
a liquid crystal layer interposed between the first substrate and the second substrate, the light transmitting portion overlapping the liquid crystal layer; and
a light source part configured to provide light to the display panel.

10. The display apparatus of claim 9, wherein the second substrate further comprises:
a first color filter having a first color;
a second color filter having a second color different from the first color; and
a third color filter which is transparent.

11. The display apparatus of claim 10, wherein the light source part comprises:
a first light source which generates a first light having a mixed color of the first color and the second color; and
a second light source which generates a second light having a third color.

12. The display apparatus of claim 11, wherein the first light source and the second light source are configured to be alternately turned on.

13. The display apparatus of claim 11, wherein the mixed color is yellow, and the third color is blue.

14. The display apparatus of claim 11, wherein the mixed color is magenta, and the third color is green.

15. The display apparatus of claim 11, wherein the mixed color is cyan, and the third color is red.

16. The display apparatus of claim 9, further comprising a gate metal pattern disposed on the first substrate.

17. The display apparatus of claim 16, wherein the light transmitting portion is overlapped with the gate metal pattern in a plan view.

18. The display apparatus of claim 17, wherein a width of the light transmitting portion taken along a horizontal direction in the cross section is less than a width of the gate metal pattern taken along the horizontal direction in the cross section.

19. The display apparatus of claim 9, wherein an optical density of the light blocking pattern is greater than about 1 and less than about 4.

20. The display apparatus of claim 9, wherein the light blocking pattern includes a slit mask reduced portion or a half tone mask reduced portion of light blocking pattern material.

* * * * *